United States Patent [19]

Emsens

[11] Patent Number: 5,161,447

[45] Date of Patent: Nov. 10, 1992

[54] DEVICE FOR SLICING MEATS AND/OR VEGETABLES FOR MAKING SHISH KABOBS

[75] Inventor: Michel Emsens, Fraisses, France

[73] Assignee: Emsens Antoine Sarl, France

[21] Appl. No.: 739,966

[22] Filed: Aug. 5, 1991

[30] Foreign Application Priority Data

Sep. 3, 1990 [FR] France .................. 90 10227

[51] Int. Cl.⁵ .................. A22C 17/02; B26D 7/02
[52] U.S. Cl. .................. 83/751; 83/762; 83/454; 83/466.1; 83/644; 83/647; 99/538
[58] Field of Search .................. 83/638, 642, 646, 647, 83/454, 455, 466.1, 751, 761, 762, 821, 644; 99/538, 537

[56] References Cited

U.S. PATENT DOCUMENTS

| | | | |
|---|---|---|---|
| 2,290,169 | 7/1942 | Debus | 83/454 |
| 4,056,026 | 11/1977 | Panaritis et al. | 83/454 |
| 4,604,771 | 8/1986 | Dolle | 83/466.1 X |
| 4,625,364 | 12/1986 | Adams | 83/466.1 X |
| 4,934,026 | 6/1990 | McNerney | 83/762 X |

FOREIGN PATENT DOCUMENTS 2494092  5/1982  France .................. 99/537

*Primary Examiner*—Frank T. Yost
*Assistant Examiner*—Eugenia A. Jones
*Attorney, Agent, or Firm*—Eckert Seamans Cherin & Mellott

[57] ABSTRACT

A device for slicing food for the production of shish kabobs includes an assembly having blades in correspondence with and in alignment with slits in a container that carries layers of food. The assembly is movable in translation to and from the container and angularly in parallel with the slits. The blades successively perform a movement of penetration into the interior of the container, a movement of angular pivoting along an arc of a circle corresponding to the height of the container, and a movement of withdrawal from the container, so as to assure by the combination of these movements the slicing of all of the layers of food.

9 Claims, 3 Drawing Sheets

DEVICE FOR SLICING MEATS AND/OR VEGETABLES FOR MAKING SHISH KABOBS

BACKGROUND OF THE INVENTION

1. Field of the Invention

The invention relates to the field of devices for slicing foods, and more particularly, to an apparatus having multiple blades which are movable in both translation and angular pivoting for automatic production of sliced foods.

2. Prior Art

The production of shish kabobs made of meats and-/or of vegetables or other food products, it is known to use containers intended to be filled with different layers of the product(s) involved. The container is designed to work with systems intended to provide for the skewering of skewers or wooden sticks through the various layers arranged within In addition, in a known manner, each of the surfaces of the container has a multiplicity of vertical slits allowing passage of a cutting means for the creation of shish kabobs and such. This cutting may be performed either manually or automatically.

In the case of manual cutting, there is introduced into the top part of the container a knife blade successively in each of the slits, a pushing down effort combined with a back-and-forth movement are exercised on the knife. This procedure is performed on two perpendicular surfaces of the container. It can be seen that this slicing method is laborious and is not suitable for the industrial production of shish kabobs.

In order to resolve these drawbacks, apparatus and devices have been proposed for performing the cutting in an automatic manner. In all forms of implementation, these devices are essentially comprised of a multiplicity of blades arranged in correspondence and alignment with the slits in the container. This state of the art can be illustrated, for example, by the teaching of patents FR 8024482 and FR 8221153 which propose two different solutions each of which has advantages and drawbacks notably in terms of the quality and speed of the cutting. These drawbacks are essentially the result of the means employed and the movement applied to each of the blades.

The purpose of the present invention is to resolve these drawbacks in a simple, effective and rational manner.

SUMMARY OF THE INVENTION

The problem that the invention proposes to resolve is to assure a perfect cutting quality without diminishing the production rate, i.e., to be able to slice all of the layers of meats and/or vegetables in the container within a very reduced period of time.

This problem is resolved in that the assembly equipped with the blades is controlled by means for moving the blades to successively perform a movement of penetrating into the interior of the container, a movement of angular pivoting according to an arc of a circle limited so as to correspond to the entire height of the container, and a withdrawal movement so as to assure by the combination of these movements the slicing of the totality of the various layers of meats and/or vegetables.

In order to resolve the problem posed of facilitating cutting at the moment of the penetration of the blades into the container, the blades occupy an angular position delimiting in relation to the horizontal plane an acute angle located on the cutting edge side of the said blades.

Another problem that the invention proposes to resolve is to diminish the forces exercised on the container, while still facilitating cutting, taking into account the movement described by the blades. This problem is resolved in that the assembly is equipped with organs capable of causing each of the blades to alternately perform a horizontal vibration movement corresponding to a pushing force and to a pulling force to balance the efforts exercised on the container at the time of cutting.

Advantageously, with regard to the problem of causing the blades to perform a special movement combining multiple movements in space so as to assure slicing, the means for moving may include translation control means and pivot means. In a preferred embodiment, the assembly comprises a block mounted in a freely articulated manner on a base controlled by translation control means for moving the base in translational movement in the direction of the container, the said block being coupled to the blades and controlled by pivot means for angular pivoting along the arc of a circle.

The problem posed of causing each of the blades respectively to alternately perform a pushing movement and a pulling movement is resolved in that the block carries the blade-coupling organs in the form of two independent modules mounted with the capacity of linear translational movement limited to the interior of the said block, with each of the said modules being coupled to a reciprocating control means for alternating linear movement in two opposite directions, with each module equipped with a series of blades.

The modules are arranged in a superimposed manner with the coupling end parts of the blades being configured such that after attachment to the corresponding modules, the said blades are arranged in the same horizontal plane.

The problem posed of having all of the blades in the same horizontal plane is resolved in that the coupling ends of the blades have a shoulder that fits into corresponding grooves of the modules.

Advantageously, with regard to the inclined position of the blades at the time of their penetration into the container, the articulation of the block carrying the blades is positioned essentially an equal distance from the top and bottom parts of the container.

Taking into account the problem posed and the combined specific movements of the blades for performing the slicing, the device in accordance with the invention is provided with means for moving the blades, which means capable of assuring the following operating cycle, in combination with position detectors:

translational movement of the assembly in the direction of the container with the blades inclined;

penetration of the blades in the inclined position into the various layers of meats and/or vegetables at the top or bottom part of the container.

when at least the free end of the blades has penetrated into the totality of the width of the container, angular pivoting of the assembly according to an arc of a circle describing the totality of the height of the container;

translational movement of the assembly in the opposite direction for withdrawal of the blades.

The device is particularly advantageously applied to a machine for the automatic production of meat and/or vegetable shish kabobs.

The cutting device can be used either separately, directly in relation with a container filled with various layers of meats and/or vegetables that have been skewered in advance, or in combination with an automatic skewering device such as that described in patents FR No. 8221153 and 8517975.

BRIEF DESCRIPTION OF THE DRAWINGS

The invention is described below in greater detail with the assistance of the attached drawings in which.

DETAILED DESCRIPTION OF THE OF THE PREFERRED EMBODIMENTS

Figure 2:
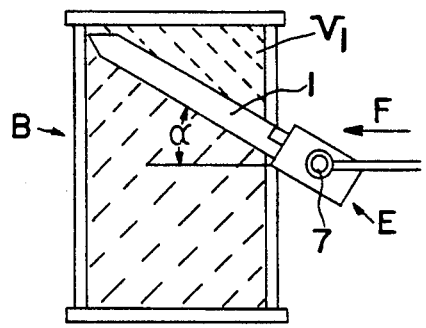
FIGS. 1, 2, 3 and 4 are schematic diagrams showing the operating principle of the cutting device in accordance with the invention.

The cutting device in accordance with the invention is comprised of an assembly (E) equipped with a multiplicity of blades (1) arranged in correspondence and alignment with the slits (B1) of a container (B). In a completely known manner, this container (B) contains various layers of meats and/or vegetables. Similarly, also in a known manner, the assembly (E) is mounted with the capacity of translational movement in the direction of the container (B).

In accordance with a basic characteristic of the invention, the assembly (E) is controlled by means for moving the blades (1) in multiple successive movements, i.e.:

a movement of penetration into the interior of the container a movement of angular pivoting according to an arc of a circle limited and determined to correspond to the total height of the container a withdrawal movement.

The combination of these movements assures the slicing of all of the various layers of meats and/or vegetables contained within the container.

Advantageously, at the moment of penetration into the container, the blades (1) occupy an angular position ($\alpha$) which delimits in relation to the horizontal plane an acute angle located at the cutting-edge side (1a) of the said blades.

Essentially, the assembly (E) is comprised of block (2) mounted in a freely articulated manner on a sliding base (3). The base is mounted in a freely sliding manner on guide rails (4) and is coupled to a control organ (5) of the jackscrew type defining a translation control for moving the base in linear translational movement in the direction of the container (B).

The block (2) is designed to carry the various blades (1). In addition, the block (2) is controlled by pivot means (6) for angular pivoting in relation to its axis of articulation (7) so as to cause the concomitant variation in the angular position of the blades according to the movement over the arc of a circle. For example, the pivot means (6) are comprised of two vertical jackscrews the rod (6a) of which is coupled to a part of the base, while the barrel (6b) is coupled in an articulated manner to a part of the block (2).

In accordance with another characteristic, the blades (1) are coupled to the block (2) in combination with organs (8) and (9) capable of alternately causing each of the blades to perform a horizontal vibration movement, respectively, in a pushing direction (P) and a pulling direction (T). As is shown in FIG. 6, the organs (8) and (9) are constituted by two independent modules mounted with the capacity for linear translational movement inside the block (2).

For example, each module is mounted so as to freely slide on two parallel guide rails (10-11) and (12-13). Each of the modules (8) and (9) is coupled to the rod (14a-15a) of a jackscrew (14-15) so as to assure the alternate translational movement of the said modules. In addition, as shown, taking into account the problem posed of causing every other blade to perform a pushing (P) and pulling (T) effort, the jackscrews (14) and (15) are controlled in opposite directions such that when jackscrew (14) pushes module (8), jackscrew (15) pulls module (9), and vice versa. Thus, the modules (8) and (9) cause every other blade to alternately perform a pushing and pulling movement, which makes it possible to balance the forces exerted on the container at the moment of cutting as will be shown below.

Figure 6:
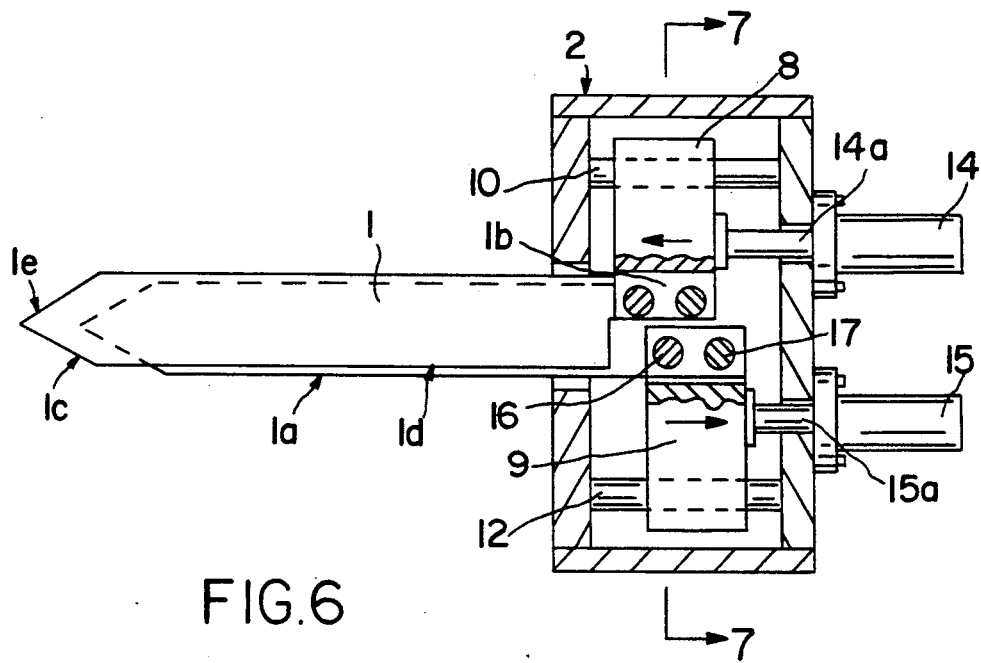
FIG. 6 is a larger scale longitudinal section showing an example of the coupling of the knife blades in the support block.
Figure 7:
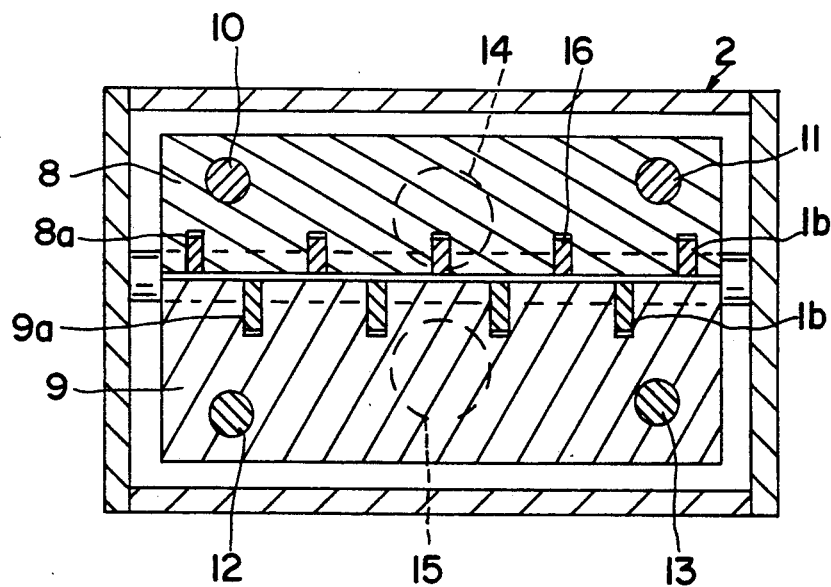
FIG. 7 is a cross-sectional view along line 7—7 of FIG. 6.

FIGS. 6 and 7 show that the two modules (8) and (9) are arranged in superposition. The coupling end part (1b) of the blades (1) is designed to assure the positioning of all of the blades in a single plane. For example, the coupling ends (1b) have a shoulder which fits into corresponding grooves (8a) and (9a) in modules (8) and (9). Attachment of the blades to their respective modules can, for example, be effected by means of two screw rods (16) and (17) engaged in the shoulders of the blades and each fitted with a nut.

In a preferred form of implementation, the axis of articulation (7) of the block (2) carrying the blades is positioned essentially at equal distances from the top and bottom parts of the container (B). Thus, the movement in the arc of a circle described by all of the blades, the center of rotation of which is constituted by the axis (7), is symmetrical in relation to the said container. Other positions of the axis of articulation (7) are not excluded, with the sole condition being that the arc of a circle described during the angular pivoting of the blades, and as a function of the angular position of the said blades, makes it possible to take into account the entire height of the container.

The device in accordance with the invention uses blades (1) of all known, suitable types, notably rectilinear blades with cutting-edge parts (1c) and (1d) respectively at the end of the blade and along the entire lower edge of the blade. This or these cutting-edge part(s) can also be formed with indentations to facilitate release of the products as they are cut.

Figure 1:
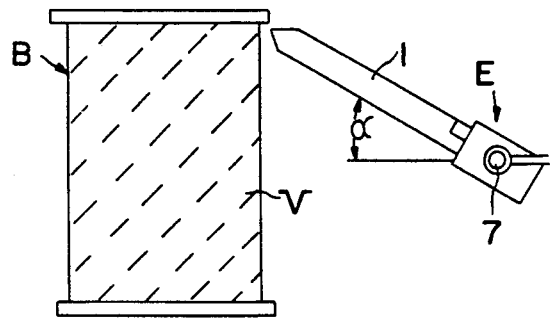
Figure 3:
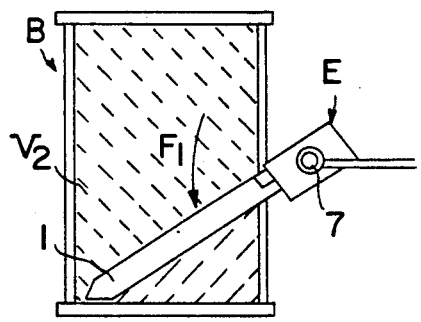
Figure 4:
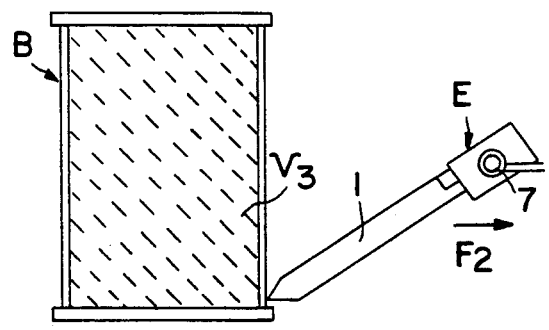
Figure 8:
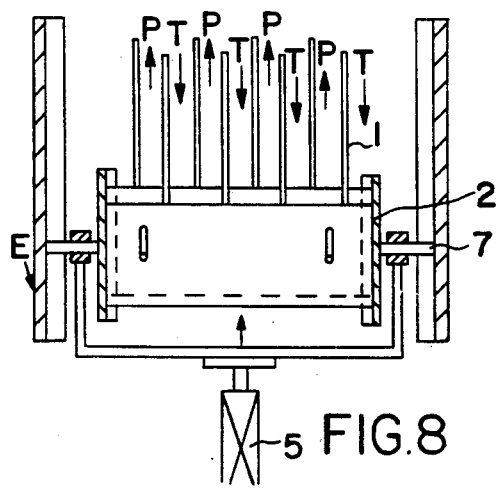
FIG. 8 is a plan view and a schematic cross section of the device.
Figure 9:
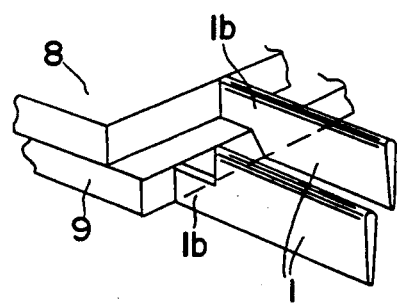
FIG. 9 is a partial view in perspective showing the coupling of the knife blades.
Figure 5:
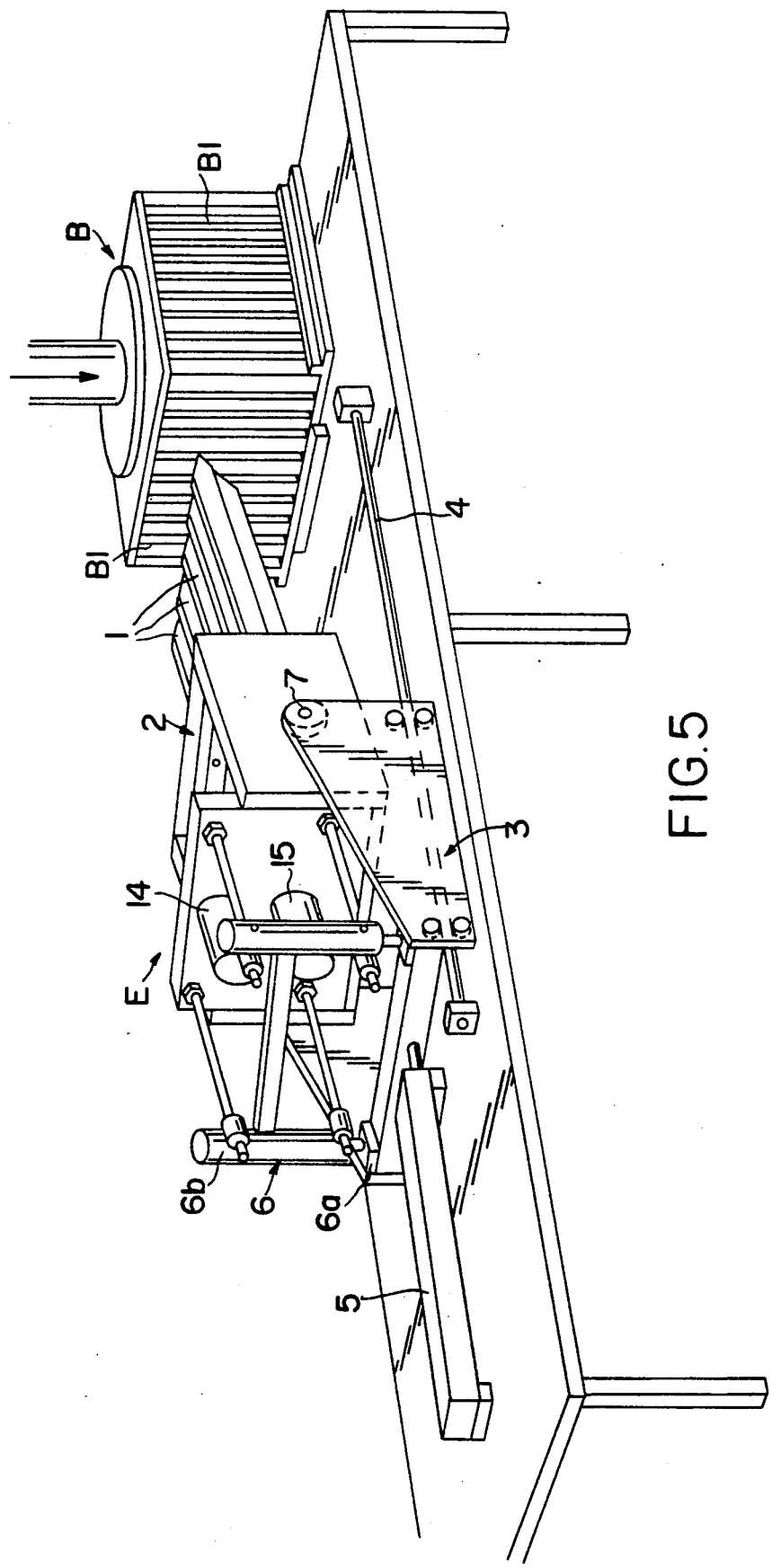
FIG. 5 is a perspective view of the cutting device in accordance with the invention.

In the form of implementation illustrated, the end of each of the blades, on the cutting edge side (1c), has a bevelled part (1e). In the inclined position of the blade assembly (1) at the time of penetration into the container, the bevelled part (1e) is positioned essentially parallel to the top edge of the container (FIGS. 1 and 2). Similarly, with regard to the cutting end (1c) which, after angular pivoting of the blade assembly along the arc of a circle, is positioned essentially parallel to the bottom of the said container (FIGS. 3 and 4).

The cutting device in accordance with the invention, as described and illustrated, is controlled by a central control equipped with various position detectors so as to perform the following operation cycle as illustrated in FIG. 1, 2, 3 and 4.

In the resting position, the blades (1) are positioned angularly according to the angle (α) in relation to the horizontal plane on which is positioned the container (B) (FIG. 1).

The assembly (E) is moved in translational movement according to the arrow (F) (FIG. 2) in the direction of the container by means of the jackscrew (5), thus inducing the angular penetration of the blades (1) into the various layers of meats and/or vegetables (V) via the slits (B1) in the container (B). At this stage, a portion of the layers of meats and/or vegetables (V1) is cut (FIG. 2).

When the blades have penetrated through at least the entire width of the container, the jackscrews (6) are actuated to induce in a concomitant manner the angular tilting of the block (2) in relation to its axis of articulation (7) which causes movement of the blades (1) according to an arc of a circle (F1) (FIG. 3). This movement of the blades (1) along the arc of a circle causes the cutting of the various layers of meats and/or vegetable (V2) along the entire height of the container on the side of the cutting-edge end (1C) of the said blades.

The assembly is then moved translationally in the opposite direction, according to the arrow (F2) (FIG. 4), in order to terminate the slicing of the parts of the layers of meats and/or vegetables (V3) that have not yet been processed by the blades (1) (FIG. 4).

The cutting device in accordance with the invention can be employed in different manners. For example, the device can be used directly with a container filled with various layers of meats and/or vegetables that have been skewered in advance. In this case, the device is mounted on a support frame designed to hold the container, with means permitting the angular indexing of the container so as to present two of its surfaces at right angles successively in relation to and in alignment with the blades.

Alternatively, the device can be mounted in combination with an automatic skewering device which has a machine designed for that purpose.

Although the advantages of the invention emerge from description, the following can be specifically emphasized:

the perfect quality of the cutting without decreasing the production rate.

the possibility of combining the cutting device with an automatic skewering device.

the simplicity of implementation which guarantees high operating reliability.

What is claimed is:

1. A device for slicing food, particularly for production of shish kabobs, comprising:

an assembly equipped with a plurality of blades positioned in correspondence with and in alignment with slits in a container for carrying layers of food in superposition, the assembly being mounted with capacity for translational movement toward and away from the container and for angular movement of the blades along the slits; and, means for moving the assembly such that the blades successively perform a translational movement of penetration into an interior of the container, a movement of angular pivoting along an arc of a circle corresponding to the entire height of the container, and a translational movement of withdrawal from the container, so as to assure by the combination of these movements the slicing of all of the layers of food.

2. The device in accordance with claim 1, wherein when the blades penetrate into the interior of the container, cutting edges of the blades define an acute angle relative to a plane bounding the interior of the container.

3. The device in accordance with claim 1, wherein the assembly is equipped with organs capable of causing the blades to perform opposite movements such that when one blade pushes, an other blade pulls, corresponding respectively to a pushing force and a pulling force so as to balance forces exerted on the container while cutting.

4. The device, in accordance with claim 3, wherein the assembly comprises a block mounted in a freely articulated manner on a base, the blades being coupled to the block, and the means for moving the blades comprises translation control means for moving the base in translational movement toward and away from the container, and pivot means for angular pivoting of the block along an arc of a circle.

5. The device in accordance with claim 4, wherein the blades are coupled to the block by at least two independent modules mounted with capacity for linear translational movement with respect to the block, each of the modules being coupled to reciprocating control means for alternating linear movement in opposite directions.

6. The device in accordance with claim 5, wherein the at least two modules are arranged in superposition, and the blades are coupled to the at least two modules such that the blades extend in a single plane.

7. The device in accordance with claim 6, wherein the blades have coupling ends defining shoulders that into corresponding grooves in the at least two modules.

8. The device in accordance with claim 4, wherein the block is angularly pivoted such that the blades move along an arc, opposite ends of the arc being an equal distance from top and bottom parts of the container, respectively.

9. The device in accordance with claim 1, wherein the means for moving is operable to define an operation cycle, in combination with position detectors, including translational movement of the assembly toward the container with the blades inclined;

penetration of the blades in the inclined position, into the layers of food at a level of one of a top and a bottom part of the container;

when at least a free end of the blades has penetrated an entire width of the container, angular pivoting of the assembly along an arc of a circle describing an entire height of the container; and, translational movement of the assembly away from the container for withdrawal of the blades.

* * * * *

UNITED STATES PATENT AND TRADEMARK OFFICE
CERTIFICATE OF CORRECTION

PATENT NO. : 5,161,447
DATED : November 10, 1992
INVENTOR(S) : Michel Emsens

It is certified that error appears in the above-identified patent and that said Letters Patent is hereby corrected as shown below:

On title page, item [30], Foreign Application Priority Data,

"Sep. 3, 1990" should read --Aug. 3, 1990--

Column 1, line 13, "The production" should read --For the production--.

Column 1, line 19, after "within", insert --.--.

Column 2, line 55, after "means" insert --are--.

Column 3, line 28, delete "OF THE", second instance.

Column 6, line 45, before "into" insert --fit--.

Signed and Sealed this

Fifth Day of October, 1993

Attest:

BRUCE LEHMAN

*Attesting Officer*      *Commissioner of Patents and Trademarks*